Patented Oct. 23, 1923.

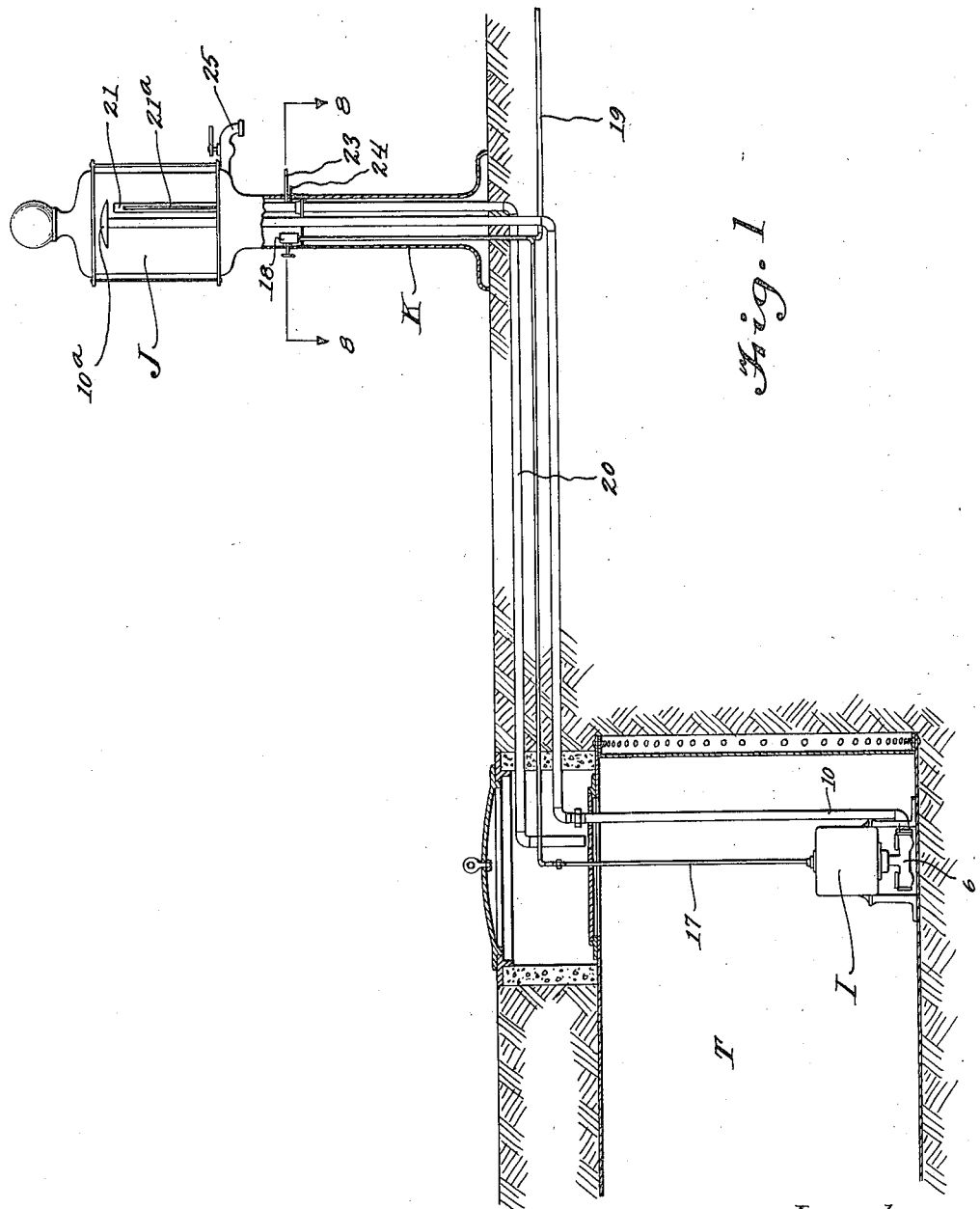

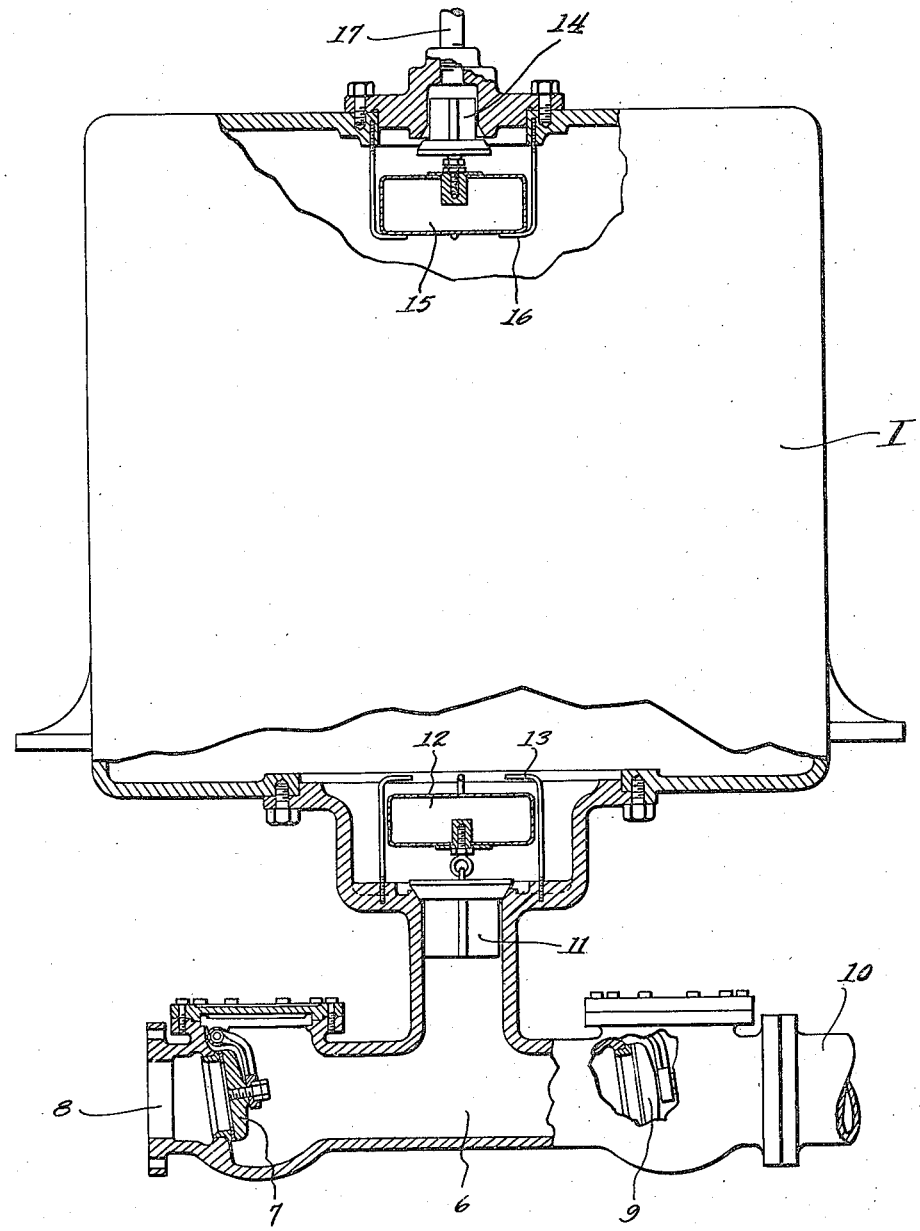

1,471,529

UNITED STATES PATENT OFFICE.

WALDO P. SCHIRMER, OF LAKEWOOD, OHIO.

APPARATUS FOR DISPENSING LIQUIDS.

Application filed April 17, 1922. Serial No. 553,670.

*To all whom it may concern:*

Be it known that I, WALDO P. SCHIRMER, a citizen of the United States, residing at Lakewood, in the county of Cuyahoga and State of Ohio, have invented certain new and useful Improvements in Apparatus for Dispensing Liquids, of which the following is a specification.

This invention relates to apparatus for dispensing liquids, and is particularly useful for dispensing gasoline and the like at service stations. The structure comprises means for trapping a fixed amount of the liquid to be dispensed in a suitable tank equipped with valves in such manner that a predetermined pressure of air can be applied to the liquid in the tank, for causing the liquid to be delivered to a suitable dispensing outfit or tank, and also arranged that no pressure is applied to the main storage tank. The operation of the apparatus is such that the velocity of the flow of the liquid being trapped causes a head pressure to be automatically developed in the trapping tank, thus causing a saving in the amount of air necessary to be applied to deliver the liquid to the dispenser.

The dispenser, meaning thereby the tank or receptacle from which the gasoline is directly delivered to the purchaser, is equipped with a turning valve which can be so operated as to measure the amount of liquid to be dispensed. The parts are capable of various modifications for use with different kinds of liquids, as will be referred to hereinafter.

The invention is illustrated in the accompanying drawings in which Fig. 1 is a side elevation of the apparatus, parts being shown in section. Fig. 2 is a sectional view of the trapping tank which is or may be located in the main storage tank.

Referring specifically to the drawings, T indicates the main storage tank, shown under ground as usual. I is a trapping tank therein, located at the bottom thereof. J is the dispensing tank or vessel, mounted on a stand K at the station. This latter may have the form of a glass or "visible" container, but other kinds of dispensers may be used.

The capacity of the trapping tank I will ordinarily be slightly greater than that of the dispensing tank J, and this tank is provided at the bottom with a T-fitting 6 which has a check valve 7 opening inwardly at an inlet 8 through which the liquid is received from the main tank T, this opening naturally being near the bottom of the main tank. The other branch of the T-fitting has a check valve 9 which opens outwardly to a pipe 10 which leads out and up to the tank J, into which it discharges through a head 10ª. The stem of the T-fitting has a check valve 11, opening upwardly, and carried by a float 12, the rise of which is limited by stops 13, and this valve 11 controls the flow into and out of the trapping tank I.

At the top the trapping tank has a valve 14, opening inwardly, and connected to a float 15 the drop of which is controlled by stops 16. This valve 14 controls an air pressure pipe 17 which extends to a two-way air valve 18, constructed to admit air pressure through a pipe 19 from any suitable air pump (not shown) or to selectively vent the air from the pipe 17 and the tank I. 20 is an overflow or return pipe leading from the tank J, back to the main tank T, and this pipe 20 connects at its upper end with a tube 21 which may be turned and which forms the outer member of a tubular overflow valve which can be adjusted by the handle 23 working above the indicator 24 to permit all liquid above a certain quantity to overflow back to the main tank. 25 is an outlet faucet from the tank J.

In operation, the valve 18 is first set to vent the tank I to atmospheric pressure, and this permits the liquid in the main tank T to flow through the valves 7 and 11 into the tank I, causing the float 12 to lift the valve 11, and liquid continues to flow until the float 15 is lifted and the valve 14 is closed, thereby stopping the exhaust of air. The velocity of the inflowing liquid plus the head pressure in the storage tank T will develop an air pressure in the trapping tank I, and the valve 7 will then close, preventing the return of the liquid in the trapping tank I to the storage tank T. The amount of liquid which will be allowed to flow into and out of the trapping tank I can be controlled within certain limits by the adjustments permitted by the screw connections between the valve 11 and its float 12 and the valve 14 and its float 15. This is desirable as a close ratio of the volume contained in the trapping tank I and the dispenser tank J can be maintained, so that it will not be necessary to raise a superfluous amount of liquid to the dispenser, thus resulting in a saving in operating cost.

When the tank I is filled as stated it can remain at rest until it is desired to raise the liquid from the tank I to the dispenser. To produce this result the rotary valve 21ª is first set by means of the lever 23 according to the amount desired. Then, the valve 18 is operated to connect the pipes 17 and the air pressure supply pipe 19, and the pressure will then flow through the pipe 17, un-seat the valve 14 and force out the liquid in the tank I through the valve 9 (the valve 11 being held open by the float 12) and pipe 10 into the dispensing tank J and the liquid will continue to flow until the float 12 allows the valve 11 to close. The liquid thus having been transferred to the dispensing tank J will overflow or escape through the pipe 20 until it reaches the level corresponding to the port opening in the controlling valve, and after it has come to rest it can then be delivered from the dispenser J by the faucet F. To repeat the operation, the air valve 18 is again operated to reduce the pressure in the tank I and allow it to refill.

For use for example with heavy oils which will not flow freely by gravity and it is desirable or necessary to force the oil by pressure from the dispenser, the valve, or rather the pipe 22 is closed, and the oil will be forced into the dispenser where it will compress the air therein into a pneumatic head, and, the faucet 25 being opened, the heavy oil will be forced therefrom by the air pressure developed, the amount of pressure being regulated by the amount of air delivered to the liquid in the trapping tank I.

So far as the trapping tank construction is concerned, it will be seen that the check and float valves will automatically operate to control the operation by merely controlling the air valve 18. Also the valve in the dispenser is simple and capable of easy application and adjustment. The whole forms an apparatus by means of which a measured quantity of liquid can be rapidly and conveniently dispensed, without the necessity for hand pumping and the like, the outfit being particularly serviceable in connection with a visible dispenser.

I claim:

1. The combination of a supply tank, a trapping tank having an inlet connection to the supply tank provided with a check valve to prevent back flow from the trapping tank to the supply tank, an air pipe connection to the trapping tank, provided with a vent and pressure valve to vent air from the tank or supply air under pressure thereto, a float valve in the tank, controlling said air pipe connection, an outlet from the trapping tank provided with an outwardly opening check valve, and a float in the tank, controlling said outlet.

2. The combination of a supply tank, a trapping tank having a T-fitting connected to the bottom thereof, one branch of the T communicating with the supply tank and having an inwardly opening check valve, the other branch of the T forming an outlet and having an outwardly opening check valve, and the stem of the T having an inwardly opening float valve therein; and an air pipe connected to the top of the trapping tank and provided with controlling means to vent air from the tank or supply pressure thereto.

3. The combination of a supply tank, a trapping tank having a T-fitting connected to the bottom thereof, one branch of the T communicating with the supply tank and having an inwardly opening check valve, the other branch of the T forming an outlet and having an outwardly opening check valve, and the stem of the T having an inwardly opening float valve therein, and an air pipe connected to the top of the trapping tank and provided with controlling means to vent air from the tank or supply air pressure thereto, said means including a float valve in the tank adapted to automatically stop the venting when the tank is filled.

In testimony whereof, I do affix my signature in presence of two witnesses.

WALDO P. SCHIRMER.

Witnesses:
JOHN A. BOMMHARDT,
BESSIE F. POLLAK.